United States Patent
Shi

(10) Patent No.: US 10,908,555 B2
(45) Date of Patent: Feb. 2, 2021

(54) IMAGING MODULE, DEFOCUS TESTING DEVICE AND METHOD, AND BEAM GATING CONTROL METHOD

(71) Applicant: BOE TECHNOLOGY GROUP CO., LTD., Beijing (CN)

(72) Inventor: Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 217 days.

(21) Appl. No.: 15/991,365

(22) Filed: May 29, 2018

(65) Prior Publication Data

US 2019/0025759 A1    Jan. 24, 2019

(30) Foreign Application Priority Data

Jul. 21, 2017 (CN) .......................... 2017 1 0602694

(51) Int. Cl.
| | | |
|---|---|---|
| *G03H 1/24* | (2006.01) | |
| *G02F 1/13357* | (2006.01) | |
| *G03B 43/00* | (2021.01) | |
| *G01M 11/02* | (2006.01) | |
| *G03H 1/22* | (2006.01) | |

(52) U.S. Cl.
CPC .......... *G03H 1/24* (2013.01); *G01M 11/0257* (2013.01); *G02F 1/1336* (2013.01); *G03B 43/00* (2013.01); *G03H 1/2286* (2013.01); *G03H 2223/17* (2013.01)

(58) Field of Classification Search
CPC .. G01M 11/0257; G02F 1/1336; G03B 43/00; G03H 1/2286; G03H 1/24; G03H 2223/17; A61K 31/05; A61K 47/10; A61K 47/26; A61K 47/36; A61M 1/287; A61M 2202/0021

USPC .................................................. 356/121–137
See application file for complete search history.

(56) References Cited

U.S. PATENT DOCUMENTS

| | | | | |
|---|---|---|---|---|
| 5,311,249 A | * | 5/1994 | Kamon | .................... G03F 7/701 355/53 |
| 6,473,160 B2 | * | 10/2002 | Suzuki | .................. G03F 7/7005 355/53 |
| 2013/0207952 A1 | | 8/2013 | Yu | |
| 2014/0071261 A1 | * | 3/2014 | Yamazoe | ........... G01M 11/0257 348/79 |

(Continued)

FOREIGN PATENT DOCUMENTS

| | | |
|---|---|---|
| CN | 102385181 A | 3/2012 |
| CN | 202710289 U | 1/2013 |

(Continued)

OTHER PUBLICATIONS

Chinese Office Action in corresponding Chinese Application No. 201710602694.X dated Apr. 17, 2019 (an English translation attached hereto). 12 pages.

*Primary Examiner* — Tri T Ton
(74) *Attorney, Agent, or Firm* — Leason Ellis LLP

(57) ABSTRACT

An imaging module, including a lens and a transmissive display panel disposed adjacent to each other, and a controller electrically connected to the transmissive display panel, the controller loading a white image on a preset area of the transmissive display panel so that a light beam passes through the preset area. A light beam gating control method, a testing apparatus and method for an imaging module are further provided.

10 Claims, 3 Drawing Sheets

S1 — according to imaging requirement, the controller loading a white image on a preset area of the transmissive display panel so that a light beam passes through the preset area, and the light beam gated by the transmissive display panel is converged at a side where the test camera is located so as to form a light spot S2 — adjusting the position of the test camera to obtain the light spot with the smallest size, calculating an offset between the position of the light spot with the smallest diameter and the ideal focus position to obtain the defocus and recording it S3 — repeating S1 and S2 until a light beam passes through respective preset areas on the transmissive display panel, and determining the defocus of the respective preset area

(56) References Cited

U.S. PATENT DOCUMENTS

2014/0184861 A1     7/2014   Georgiev et al.

FOREIGN PATENT DOCUMENTS

| CN | 105115446 A | 12/2015 |
|---|---|---|
| CN | 105423911 A | 3/2016 |
| JP | 2014137449 A | 7/2014 |
| JP | 2017098596 A | 6/2017 |
| WO | 2015075217 A1 | 5/2015 |

* cited by examiner

S1 — according to imaging requirement, the controller loading a white image on a preset area of the transmissive display panel so that a light beam passes through the preset area, and the light beam gated by the transmissive display panel is converged at a side where the test camera is located so as to form a light spot S2 — adjusting the position of the test camera to obtain the light spot with the smallest size, calculating an offset between the position of the light spot with the smallest diameter and the ideal focus position to obtain the defocus and recording it S3 — repeating S1 and S2 until a light beam passes through respective preset areas on the transmissive display panel, and determining the defocus of the respective preset area

Fig. 3

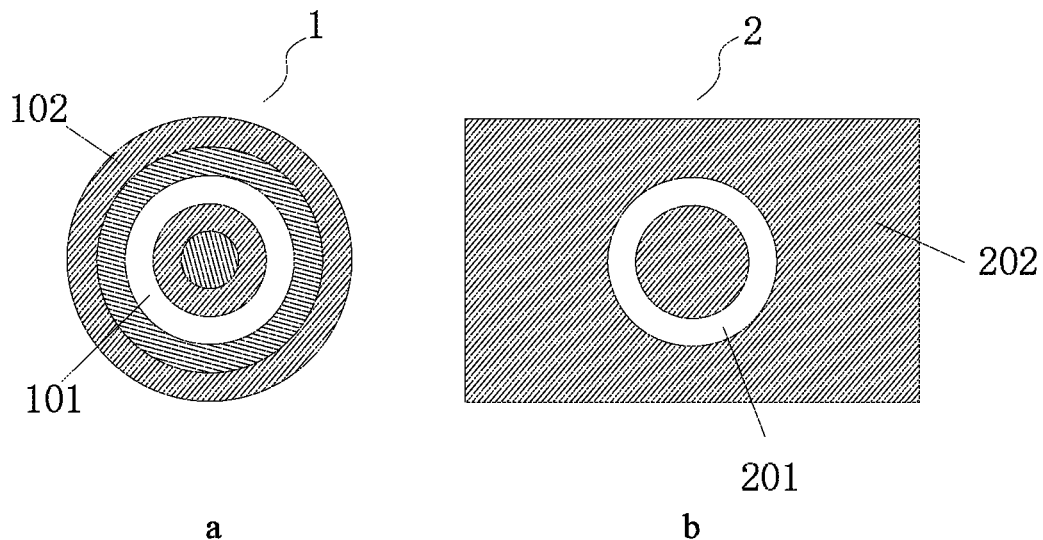

Fig. 4

IMAGING MODULE, DEFOCUS TESTING DEVICE AND METHOD, AND BEAM GATING CONTROL METHOD

The present disclosure claims priority of Chinese Patent Application No. 201710602694.X filed on Jul. 21, 2017, the disclosure of which is hereby entirely incorporated by reference as a part of the present disclosure.

TECHNICAL FIELD

Embodiments of the present disclosure relate to an imaging module, a defocus testing device and method, and a beam gating control method.

BACKGROUND

Window holography adopts coherent point light source illumination to form viewing windows in the direction of diffraction, thereby reducing the requirement for the display density of a display device. It is a technology that can achieve true holographic three-dimensional display at a lower cost, and has a wide range of application prospects.

Since the window holography uses coherent point light source illumination, and the coherent point light source is formed by the convergence of the light beam, the convergence quality of the light beam directly affects the quality of holographic imaging. Therefore, the measurement of the convergence quality of light beam has a very important influence on the imaging quality.

SUMMARY

At least one embodiment of the present disclosure provides an imaging module, including a lens and a transmissive display panel disposed adjacent to each other, and a controller electrically connected to the transmissive display panel, the controller loading a white image on a preset area of the transmissive display panel so that a light beam passes through the preset area.

In one embodiment of the present disclosure, areas of the transmissive display panel other than the preset area are loaded with a black image.

At least one embodiment of the present disclosure provides a light beam gating control method based on any one of the imaging modules as described above, comprising: according to imaging requirements, the controller loading a white image on the preset area of the transmissive display panel so that a light beam passes through the preset area.

At least one embodiment of the present disclosure provides a defocus testing apparatus applicable to the imaging module as mentioned above, comprising a coherent point light source and a test camera, wherein the coherent point light source is disposed at a side of the lens away from the transmissive display panel, the test camera is disposed at a side of the transmissive display panel away from the lens, and the test camera is configured to receive a light beam converged by the leans and gated by the transmissive display panel.

In one embodiment of the present disclosure, the imaging module is illuminated by the coherent point light source.

In one embodiment of the present disclosure, the coherent point light source is obtained by convergence of a laser with good coherence.

At least one embodiment of the present disclosure provides a defocus testing method for an image module, wherein the defocus testing apparatus for an imaging module is adopted, the defocus testing method comprising: S1: according to imaging requirement, the controller loading a white image on a preset area of the transmissive display panel so that a light beam passes through the preset area, and the light beam gated by the transmissive display panel is converged at a side where the test camera is located so as to form a light spot; S2: adjusting the position of the test camera to obtain the light spot with the smallest size, calculating an offset between the position of the light spot with the smallest diameter and the ideal focus position to obtain the defocus and recording it; and S3: repeating S1 and S2 until a light beam passes through respective preset areas on the transmissive display panel, and determining the defocus of the respective preset area.

In one embodiment of the present disclosure, when the defocus testing apparatus is illuminated by an axially symmetric illumination mode, the respective preset areas are concentric rings with different diameters.

In one embodiment of the present disclosure, when the defocus testing apparatus is illuminated by an off-axis asymmetric illumination mode, the respective preset areas are rectangular areas.

In one embodiment of the present disclosure, when a light beam passing through the rectangular area is converged into a light spot, a position of the light spot is recorded.

In one embodiment of the present disclosure, when horizontal light beam passing through the rectangular area is converged into a vertical focusing line, and vertical light beam passing through the rectangular area is converged into a horizontal focusing line, the position of the test camera is adjusted so that the horizontal focusing line captured by the test camera is the narrowest, and a first position of the test camera at this time is located is recorded, and then the position of the test camera is adjusted so that the vertical focusing line captured by the test camera is the narrowest, and a second position of the test camera at this time is recorded, wherein the first position and the second position respectively reflect the defocus of the imaging module in the vertical and horizontal directions.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

FIG. 3 is a schematic flowchart of a defocus testing method for an imaging module according to an embodiment of the present disclosure;

FIG. 4 is a schematic diagram of loading a white image in a preset area when a defocus testing apparatus for an imaging module adopts an axially symmetric illumination mode according to an embodiment of the present disclosure, wherein the white part in figure a is a transmissive area on a lens corresponding to the preset area and the white part in figure b is the preset area on the transmissive display panel;

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

In window holography, the convergence quality of light beam directly affects the holographic imaging quality. The coherent light source currently used can only be a coherent point light source, and light emitted by the coherent point light source passes through a large-aperture optical system to form a converging light beam capable of illuminating the liquid crystal display panel. In the process of designing, processing, and tuning a large-aperture optical system, errors are unavoidable, resulting in a poor convergence quality of the light beam. The poor convergence quality of the light beam is presented as that the convergence point of the light beam emitted from different areas in the optical system is defocused with respect to the ideal focus position (i.e., position of the convergence point without system error), resulting in aberration of the holographic imaging. The error of the optical system can be corrected by means of holographic encoding compensation to achieve the purpose of improving the imaging quality. However, the cost for continuously measuring the defocus of the optical system is very high.

Figure 1:
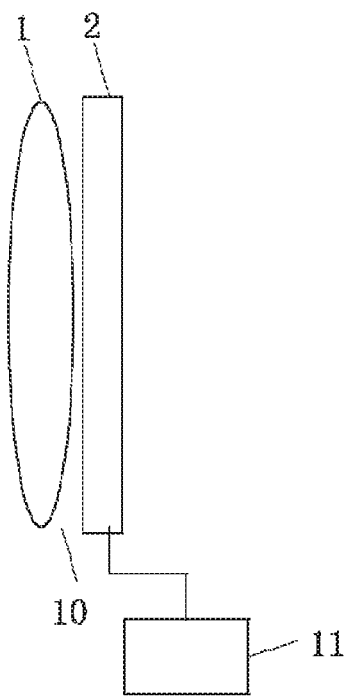
FIG. 1 is a schematic diagram of an imaging module according to an embodiment of the present disclosure.

At least one embodiment of the present disclosure provides an imaging module. As illustrated in FIG. 1, the imaging module 10 comprises a lens 1 and a transmissive display panel 2 disposed adjacent to each other, and a controller 11 electrically connected to the transmissive display panel 2. In general, depending on imaging requirements, sometimes it is only necessary to transmit light beam that reach specific areas on the transmissive display panel 2, and these areas generally need to be set in advance in order to meet imaging requirements. For ease of description, these specific areas can be collectively referred to as preset areas. It should be noted that the preset areas are not fixed but adapted to the imaging requirements. For example, the controller 11 loads a white image on these preset areas of the transmissive display panel 2 so that a light beam can pass through the preset areas. The white image refers to an image displayed when the transmissive display panel 2 has the highest transmittance, and the loading white image refers to displaying the white image on the transmissive display panel to make the transmissive display panel has the greatest transmittance so that the light beam passes through the area where the white image is loaded. Contrary to loading a white image, a black image can also be loaded on the transmissive display panel. The black image refers to an image displayed when the transmissive display panel 2 has the minimum transmittance, and the black image can block the light beam. The loading black image refers to displaying the black image on the transmissive display panel, so that the transmissive display panel has the minimum transmissivity, so that the light beam is blocked where the black image is loaded. For example, for an 8-bit gray scale digital bitmap, the gray scale range is 0-255, so an image with a gray scale of 255 is used as a white image, and an image with a gray scale of 0 is used as a black image. In the embodiment of the present disclosure, a white image is loaded on preset areas of the transmissive display panel 2 so as to have a transmittance as high as possible, and for areas other than the preset areas, it is not loaded with white image and has a very low light transmittance. In this case, a digital image can be formed which comprises an area with a gray scale of 255 and as area with a gray scale of 0, and the area with a gray scale of 255 corresponds to the preset areas. When the white image is loaded, the controller 11 loads the digital image on the transmissive display panel 2, a gray scale 255 is displayed in a preset area of the transmissive panel 2, and a gray scale 0 is displayed in other areas, and thus, light transmitting area is formed in preset areas of the transmissive display panel 2.

In an embodiment of the present disclosure, the controller 11 loads the white image on the preset areas of the transmissive display panel 2 so that the light beam which is converged by the lens 1 and reaches the transmissive display panel 2 can pass through the area where the white image is loaded at the greatest extent, that is, the area of the transmissive display panel 2 loaded with the white image has a light transmittance as great as possible for the light beam, and it is hard for the light beam to pass through an area of the transmissive display panel 2 where the white image is not loaded, that is, an area where the white image is not loaded has a low light transmittance for the light beam and it is hard for the light beam to pass through. With the above configuration, the partial beam gating function of the imaging module 10 is achieved. And at the same time, by loading white images, it is ensured that all color light beams can pass through without affecting its integrity.

In one embodiment of the present disclosure, when a white image is loaded on the preset area, a black image is loaded on other areas of the transmissive display panel 2 other than the preset area.

Obviously, the black image can reflect or absorb any color light beam in a large amount, so the an area loaded with the black image can effectively prevent the light beam from passing through, further ensuring the gating function of the transmissive display panel 2 on the light beam.

Of course, in addition to loading the black image, the area of the transmissive display panel 2 other than the preset area can be loaded with other light-impermeable images, that is, images of dark color.

The imaging module 10 can be applied in many scenes. For example, the imaging module 10 can be provided in an electronic device with a camera function, such as a digital camera or a mobile phone, to achieve the purpose of gating a specific light beam, or can be applied to the imaging module 10. Or, the imaging module can be applied in an optical laboratory, to assist in the completion of relevant optical experiments, or to form a part of some laboratory optical instruments, etc.

Based on the above imaging module 10, at least one embodiment of the present disclosure provides a beam gating method, which comprising: according to an imaging requirement, the controller 11 loading a white image on a preset area of the transmissive display panel 2, so that the light beam passes through the preset area.

When the imaging requirements are different, for example, the positions of the imaging are different, light beams emitted from different positions need to be selected, and the preset area of the transmissive display panel is loaded with a white image under control of the controller 11 so that light beam converged by the lens 1 reaching the transmissive display panel 2, the area where the white image is loaded can transmit the light beam to the greatest extent, and the light beam reaching the other area where the white image is not loaded cannot easily pass through the transmissive display panel 2.

Figure 2:
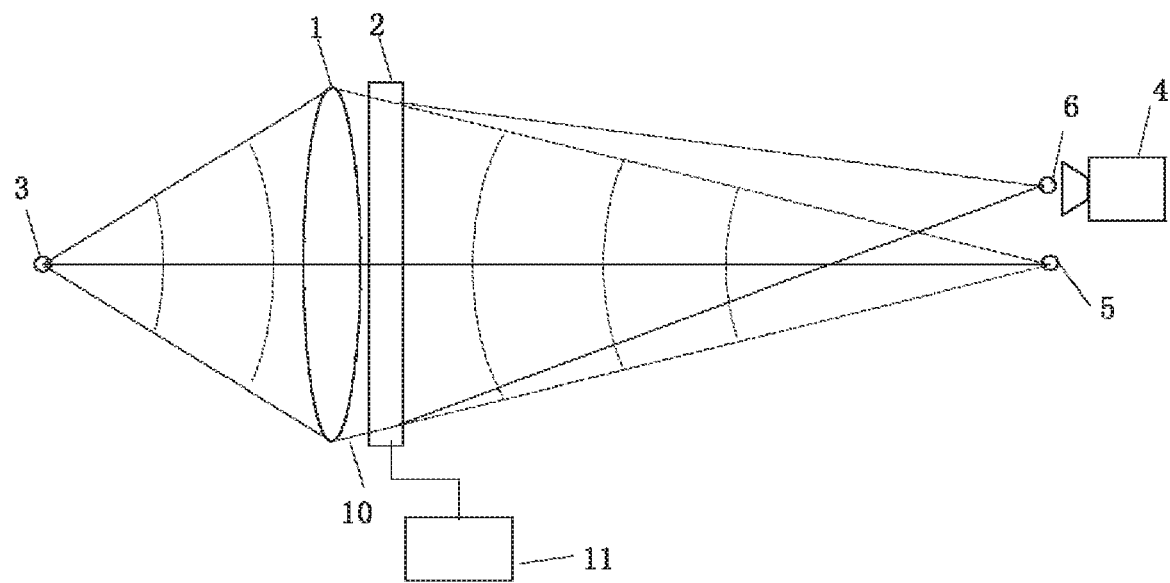
FIG. 2 is a schematic diagram of a defocus testing device for an imaging module according to an embodiment of the present disclosure.

FIG. 2 illustrates a defocus testing apparatus for an imaging module according to an embodiment of the present disclosure, the defocus testing apparatus for the imaging module comprises a coherent point light source 3 and a testing camera 4. In the test, the coherent point light source 3 is disposed on a side of the lens 1 facing away from the transmissive display panel 2, and the testing camera 4 is disposed on a side of the transmissive display panel 2 away from the lens. On the side of 1, the testing camera 4 is configured to receive a light beam converged by the lens 1 and gated by the transmissive display panel 2.

The light beam converged by the lens 1 and gated by the transmissive display panel 2 can be converged to form a light spot 6 after passing through the transmissive display panel 2, and the light spot 6 can be received by moving the test camera 4. When the diameter of the spot 6 is the smallest, position of the test camera 4 at this time is the actual focus position of the imaging module 10. Through measuring the offset of the spot 6 with respect to the ideal focus position 5, the defocus of the imaging module 10 can be determined. Wherein, the ideal focus position 5 refers to the position of the spot where the gated beam converges if there is no error in the imaging module 10.

In the defocus testing apparatus for the imaging module, the imaging module 10 adopts a coherent point light source illumination to improve the accuracy of the defocus testing apparatus.

At least one embodiment of the present disclosure provides a defocus testing method for an imaging module. As illustrated in FIG. 3, the defocus testing method comprises:

Step S1: According to imaging requirement, the controller loads a white image on a preset area of the transmissive display panel so that a light beam passes through the preset area, and the light beam gated by the transmissive display panel is converged at a side where the test camera is located so as to form a light spot.

Step S2: Adjusting the position of the test camera to obtain the light spot with the smallest diameter, calculating an offset between the position of the light spot with the smallest diameter and the ideal focus position to obtain the defocus and recording it.

For the above steps S1 and S2, reference can be made to the description of the defocus testing apparatus for the imaging module mentioned above, which will not be elaborated here.

Step S3: repeating the steps S1 and S2 until a light beam passes through respective preset areas on the transmissive display panel, and the defocus of the respective preset area is determined.

Because it is necessary to determine the defocus of the whole imaging module 10, it is necessary to determine the defocus of each part of the imaging module 10, that is, the defocus of respective preset areas, that is, each area of the transmissive display panel 2 can be configured as a preset area. It can be understood that, in each test only one area of the transmissive display panel 2 is configured as a preset area and is loaded with a white image. After the defocus of all the preset areas of the transmissive display panel 2 is determined, the defocus of the imaging module 10 can be determined in whole.

With reference to FIG. 4, when the defocus testing apparatus for the imaging module adopts the axially symmetric illumination, the preset areas are concentric rings with different diameters. For ease of understanding, FIG. b illustrates the preset ring area 201 on the transmissive display panel 2. The preset ring area 201 is loaded with a white image and other areas 202 is loaded with a black image, so the light beam can only pass through the preset ring area 201. Fig. a illustrates an area 101 on the lens 1 corresponding to the preset ring area 201, which means that only the light beam passing through the area 101 of the lens 1 can pass through the preset ring area 201, while the light beam passing through other area 102 of the lens other than the area 101 cannot pass through the transmissive display panel 2. As described above, when the preset ring area 201 changes, the area on the lens 1 also changes accordingly.

When an axially symmetric illumination is adopted, imaging by the imaging module 10 is symmetric, and the light beam passing through the transmissive display panel 2 will converge into a light spot. By setting the preset area as concentric rings with different diameters, defocus of each ring area can be measured in sequence. And thus, the defocus of the imaging module 10 is determined.

Figure 5:
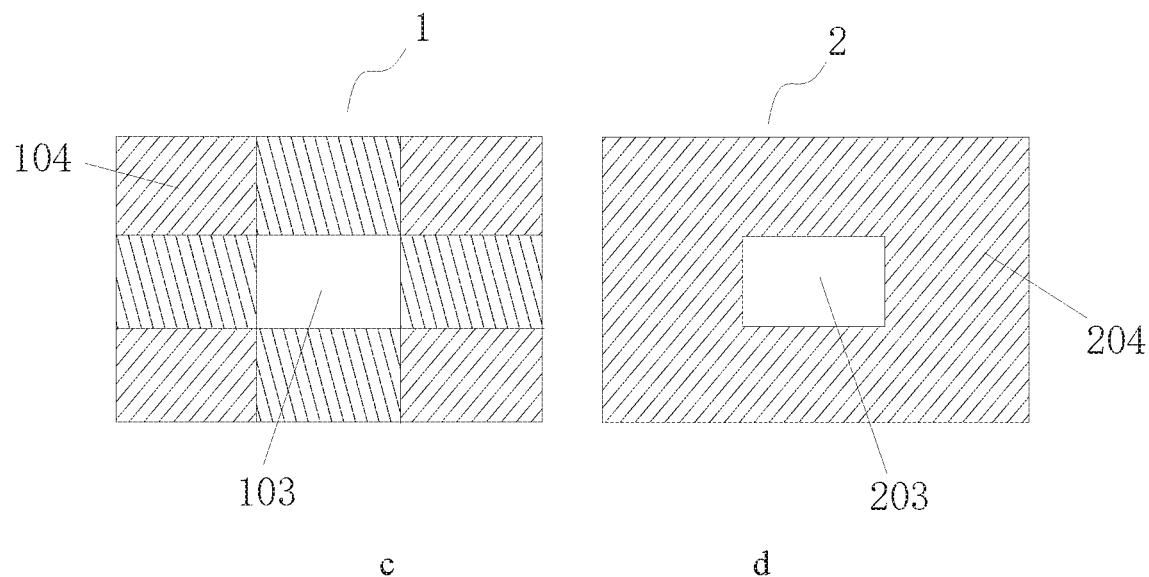
FIG. 5 is a schematic diagram of loading a white image in a preset area when a defocus testing apparatus for an imaging module adopts an off-axis asymmetric illumination mode according to an embodiment of the present disclosure, wherein the white part in figure c is a transmissive area on a lens corresponding to the preset area and the white part in figure d is the preset area on the transmissive display panel.

With reference to FIG. 5, when the imaging module is illuminated in an off-axis asymmetric illumination mode, each preset area is set as a rectangular area. For ease of understanding, FIG. d illustrates a rectangular area 203 on the transmissive display panel 2, wherein the rectangular area 203 is loaded with a white image and the other area 204 is loaded with a black image, so the light beam can only pass from the rectangular area 203. FIG. c illustrates an area 103 of the lens 1 corresponding to the rectangular area 203. Among the light beams passing through the lens 1, only the light beam passing through the area 103 can pass through the rectangular area 203, and the light beam passing through the other area 104 on the lens 1 cannot pass through the transmissive display panel 2. As previously described, when the rectangular area 203 changes, the area on the lens 1 also changes accordingly.

When the preset area is a rectangular area, there are two cases for its imaging. In one case, the light beam passing through the rectangular area 203 is converged into a light spot, which is similar to the case of adopting an axially symmetric illumination mode, so it will not be repeated.

Figure 6:
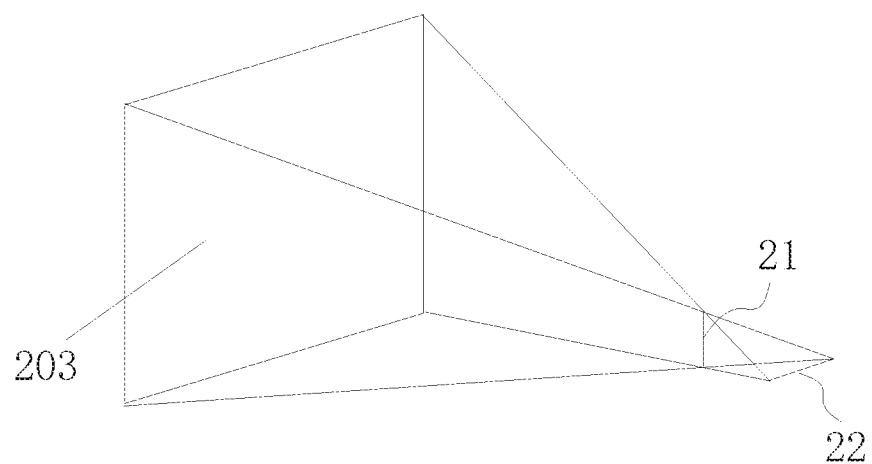
FIG. 6 is a schematic diagram of forming a horizontal focus line and a vertical focus line when a defocus testing apparatus for an imaging module adopts an off-axis asymmetric illumination mode according to an embodiment of the present disclosure.

With reference to FIG. 6, in the other case, horizontal light beam passing through the rectangular area is converged into the vertical focusing line 21, and the vertical light beam passing through the rectangular area 203 is converged into the horizontal focusing line 22. At this time, the position of the test camera 4 is adjusted so that the horizontal focusing line captured by the test camera 4 is the narrowest, a first position of the test camera at this time is located is recorded, and then the position of the test camera 4 is adjusted so that the vertical focusing line captured by the test camera 4 the narrowest, the second position of the test camera at this time is recorded, and the first position and the second position respectively reflect the defocus of the imaging module in the vertical and horizontal directions.

When the defocus testing apparatus or method for the imaging module according to the embodiments of the present disclosure is applied to holographic imaging, an error is inevitably generated in an optical system of the holographic imaging device during the process of designing, processing, and adjusting, resulting in poor quality of convergence of the light beam. The poor quality of convergence is presented as that convergence point of light beams emitted from different areas of the optical system is defocused with respect to the ideal focus position, which results in aberration of the holographic imaging. Because the error of the optical system is continuous, the defocus of the light beam in each area is gradually changed, and it is unacceptable to continuously test the defocus of the optical system in terms of cost. However, at the same time, the defocus of the light beam is gradual and in a certain area range, the defocus can be taken as a constant value, so in the defocus testing apparatus or method for the imaging module according to the embodiments of the present disclosure, the entire optical system is divided into multiple areas for holographic imaging, and then each area is tested separately so as to provide a reference. By determining the defocus of the entire optical system, the defocus of the optical system can be corrected by means of holographic encoding compensation to improve the imaging quality.

Of course, in addition to being applied to the field of the holographic technology, the defocus testing apparatus or method for the imaging module according to the present disclosure can also be applied to other fields. For example, for an electronic device having a camera function such as a digital camera, a mobile phone, etc., when there is a more serious defocus, the defocus testing apparatus or method for the imaging module according to the embodiments of the present disclosure can adopted to determine its defocus, thereby facilitating its adjustment. Alternatively, the defocusing testing apparatus or method for the imaging module according to the present disclosure can also effectively solve the problem of defocus for an optical instrument in an optical laboratory, in particular an optical device involving imaging.

Compared with the relevant art, the technical solution according to the embodiments of the present disclosure has the following advantages:

In the imaging module according to the embodiments of the present disclosure, the controller loads the white image on the preset area of the transmissive display panel so that the light beam converged by the lens and reaching the transmissive display panel is transmitted through the area which is loaded with the white images at the greatest extent, and is not transmitted through the area of the transmissive display panel which is not loaded with the white images, thereby achieving light beam gating function at a local area of the imaging module. And at the same time, by loading white images, it is ensured that light beams of all color can pass through without affecting its integrity.

A black image is loaded on area of the transmissive display panel other than the preset area on which a white image is loaded, and the black image can greatly reflect or absorb any light beam of any color, so the area occupied by the black image can effectively prevent the light beam from passing through, further ensuring the light beam gating function of the transmissive display panel.

In the beam gating control method according to the embodiments of the present disclosure, when the imaging requirements are different, such as different imaging positions, light beams emitted from different positions need to be selected, through the controller loading the white images on the preset area of the transmissive display panel, light beam converged by the lens and reaching the transmissive display panel can be transmitted through the preset area loaded with white image at the greatest extent, and it is hard for light to pass through areas not loaded with white images.

In the defocus testing apparatus for the imaging module according to the embodiments of the present disclosure, a coherent point light source is disposed at the first side of the imaging module, and a test camera is disposed on the second side of the imaging module opposite to the first side. Light beam emitted from the coherent point light source toward the imaging module is focused by the lens and is transmitted through the transmissive display panel and then is converged into a light spot at the second side. The light spot can be received by the test camera through moving the test camera back and forth. The actual focusing position of the imaging module is the position at which the radius of the light spot is minimum. When the radius of the received light spot is minimum, offset of the spot with respect to the ideal focusing position is determined, and the defocus of the imaging module can be determined.

In the defocus testing apparatus for the imaging module, a coherent point light source is adopted to improve image quality. The coherent point light source can be obtained by convergence of a laser with good coherence.

In the defocus testing method for the imaging module according to the embodiments of the present disclosure, a white image is loaded on a preset area of the transmissive display panel to gate the light beam and to converge the light beam so as to form a light spot on the second side, and at the same time, the light spot is received by the test camera by moving the test camera back and forth so as to determine the defocus of the preset area. Repeating the above steps, the defocus corresponding to all the preset areas of the transmissive display panel can be determined, so that the defocus of the imaging module can be obtained.

The foregoing are merely exemplary embodiments of the disclosure, but are not used to limit the protection scope of the disclosure. The protection scope of the disclosure shall be defined by the attached claims.

The invention claimed is:

1. A defocus testing method for an imaging module, wherein the defocus testing apparatus for an imaging module is adopted,
   wherein the defocus testing apparatus for the imaging module comprises a coherent point light source, a test camera, and an imaging module,
   wherein the imaging module comprises a lens and a transmissive display panel disposed adjacent to each other, and a controller electrically connected to the transmissive display panel, the controller loading a white image on a preset area of the transmissive display panel so that a light beam passes through the preset area,
   wherein the coherent point light source is disposed at a side of the lens away from the transmissive display panel, the test camera is disposed at a side of the transmissive display panel away from the lens, and the test camera is configured to receive a light beam converged by the leans and gated by the transmissive display panel, and wherein
   the defocus testing method comprising:
   S1: according to imaging requirement, the controller loading a white image on a preset area of the transmissive display panel so that a light beam passes through the preset area, and the light beam gated by the transmissive display panel is converged at a side where the test camera is located so as to form a light spot;
   S2: adjusting the position of the test camera to obtain the light spot with the smallest size, calculating an offset between the position of the light spot with the smallest diameter and the ideal focus position to obtain the defocus and recording it; and S3: repeating S1 and S2 until a light beam passes through respective preset areas on the transmissive display panel, and determining the defocus of the respective preset area.

2. The defocus testing method for an imaging module according to claim 1, wherein when the defocus testing apparatus is illuminated by an axially symmetric illumination mode, the respective preset areas are concentric rings with different diameters.

3. The defocus testing method for an imaging module according to claim 1, wherein when the defocus testing apparatus is illuminated by an off-axis asymmetric illumination mode, the respective preset areas are rectangular areas.

4. The defocus testing method for an imaging module according to claim 3, wherein when a light beam passing through the rectangular area is converged into a light spot, a position of the light spot is recorded.

5. The defocus testing method for an imaging module according to claim 3, wherein when horizontal light beam passing through the rectangular area is converged into a vertical focusing line, and vertical light beam passing through the rectangular area is converged into a horizontal focusing line, the position of the test camera is adjusted so that the horizontal focusing line captured by the test camera is the narrowest, and a first position of the test camera at this time is located is recorded, and then the position of the test camera is adjusted so that the vertical focusing line captured by the test camera is the narrowest, and a second position of the test camera at this time is recorded, wherein the first position and the second position respectively reflect the defocus of the imaging module in the vertical and horizontal directions.

6. A defocus testing method for an imaging module, wherein the defocus testing apparatus for an imaging module is adopted,
wherein the defocus testing apparatus for the imaging module comprises a coherent point light source, a test camera, and an imaging module,
wherein the imaging module comprises a lens and a transmissive display panel disposed adjacent to each other, and a controller electrically connected to the transmissive display panel, the controller loading a white image on a preset area of the transmissive display panel so that a light beam passes through the preset area,
wherein the coherent point light source is disposed at a side of the lens away from the transmissive display panel, the test camera is disposed at a side of the transmissive display panel away from the lens, and the test camera is configured to receive a light beam converged by the leans and gated by the transmissive display panel,
wherein the coherent point light source is obtained by convergence of a laser with good coherence, and wherein
the defocus testing method comprising:
S1: according to imaging requirement, the controller loading a white image on a preset area of the transmissive display panel so that a light beam passes through the preset area, and the light beam gated by the transmissive display panel is converged at a side where the test camera is located so as to form a light spot;
S2: adjusting the position of the test camera to obtain the light spot with the smallest size, calculating an offset between the position of the light spot with the smallest diameter and the ideal focus position to obtain the defocus and recording it; and
S3: repeating S1 and S2 until a light beam passes through respective preset areas on the transmissive display panel, and determining the defocus of the respective preset area.

7. The defocus testing method for an imaging module according to claim 6, wherein when the defocus testing apparatus is illuminated by an axially symmetric illumination mode, the respective preset areas are concentric rings with different diameters.

8. The defocus testing method for an imaging module according to claim 6, wherein when the defocus testing apparatus is illuminated by an off-axis asymmetric illumination mode, the respective preset areas are rectangular areas.

9. The defocus testing method for an imaging module according to claim 8, wherein when a light beam passing through the rectangular area is converged into a light spot, a position of the light spot is recorded.

10. The defocus testing method for an imaging module according to claim 8, wherein when horizontal light beam passing through the rectangular area is converged into a vertical focusing line, and vertical light beam passing through the rectangular area is converged into a horizontal focusing line, the position of the test camera is adjusted so that the horizontal focusing line captured by the test camera is the narrowest, and a first position of the test camera at this time is located is recorded, and then the position of the test camera is adjusted so that the vertical focusing line captured by the test camera is the narrowest, and a second position of the test camera at this time is recorded, wherein the first position and the second position respectively reflect the defocus of the imaging module in the vertical and horizontal directions.

* * * * *